US012731210B2

(12) United States Patent
Gong et al.

(10) Patent No.: US 12,731,210 B2
(45) Date of Patent: Sep. 8, 2026

(54) GENERATIVE ARTIFICIAL INTELLIGENCE

(71) Applicant: Google LLC, Mountain View, CA (US)

(72) Inventors: Haifeng Gong, Fremont, CA (US); Xiaohang Li, Cupertino, CA (US); Samuel Forrest Terwilliger, New York, NY (US)

(73) Assignee: Google LLC, Mountain View, CA (US)

( * ) Notice: Subject to any disclaimer, the term of this patent is extended or adjusted under 35 U.S.C. 154(b) by 126 days.

(21) Appl. No.: 18/629,476

(22) Filed: Apr. 8, 2024

(65) Prior Publication Data

US 2025/0315986 A1 Oct. 9, 2025

(51) Int. Cl.

| | |
|---|---|
| ***G06T 11/00*** | (2026.01) |
| ***G06F 40/284*** | (2020.01) |
| ***G06T 3/403*** | (2024.01) |
| ***G06V 10/74*** | (2022.01) |

(52) U.S. Cl.

CPC .............. *G06T 11/00* (2013.01); *G06T 3/403* (2013.01); *G06V 10/74* (2022.01); *G06F 40/284* (2020.01)

(58) Field of Classification Search

CPC ......... G06T 11/00; G06T 3/403; G06V 10/74; G06F 40/284

See application file for complete search history.

(56) References Cited

U.S. PATENT DOCUMENTS

2024/0331214 A1* 10/2024 Zhou ....................... G06T 11/60
2024/0346709 A1* 10/2024 Orton ...................... G06T 11/00
2025/0005807 A1* 1/2025 Zhang ...................... G06N 3/08
2025/0022185 A1* 1/2025 Mitchell ................ G06T 11/00
2025/0078353 A1* 3/2025 Ramesh ............... G06V 10/945
2025/0218151 A1* 7/2025 Dev ........................ G06F 40/40
2025/0225430 A1* 7/2025 Cheng ..................... G06F 9/451

OTHER PUBLICATIONS

Adiwardana et al., "Towards a Human-like Open-Domain Chatbot" CoRR, Submitted on Jan. 2020, arXiv:2001.09977v1, 38 pages.
Brown et al., "Language models are few-shot learners" CoRR, Submitted on Jul. 2020, arXiv:2005.14165v4, 75 pages.

(Continued)

*Primary Examiner* — Kee M Tung
*Assistant Examiner* — Xiaoming Wei
(74) *Attorney, Agent, or Firm* — Fish & Richardson P.C.

(57) ABSTRACT

Methods, systems, and apparatus, including computer programs encoded on a computer storage medium, for automated image generation. Methods can include generating, by an artificial intelligence ("AI") system, image prompts based on (i) a category and (ii) a set of constraints. At least one of the image prompts is removed based on a set of excluded terms that are not allowed to be included in qualified image prompts. A set of images is generated using the set of qualified image prompts. One or more images that include excluded objects are removed to obtain a set of qualified generated images. The set of qualified generated images are stored with data specifying the category. At least one qualified generated image is combined with other content, resulting in a new digital component. The new digital component is transmitted to a client device in response to a request for content in the category.

18 Claims, 4 Drawing Sheets

(56) References Cited

OTHER PUBLICATIONS

Hoffmann et al., "Training Compute-Optimal Large Language Models" CoRR, Submitted on Mar. 2022, arXiv:2203.15556v1, 36 pages.

Rae et al., "Scaling Language Models: Methods, Analysis & Insights from Training Gopher" CoRR, Submitted on Dec. 2021, arXiv:2112.11446v1, 118 pages.

Raffel et al., "Exploring the Limits of Transfer Learning with a Unified Text-to-Text Transformer" CoRR, Submitted on Oct. 2019, arXiv:1910.10683v1, 52 pages.

* cited by examiner

GENERATIVE ARTIFICIAL INTELLIGENCE

BACKGROUND

This specification relates to data processing and data integrity.

Advances in machine learning are enabling artificial intelligence to be implemented in more applications. For example, large language models have been implemented to allow for a conversational interaction with computers using natural language rather than a restricted set of prompts. This allows for a more natural interaction with the computer.

SUMMARY

In general, one innovative aspect of the subject matter described in this specification can be embodied in methods that include the actions of generating, by an artificial intelligence ("AI") system, image prompts based on (i) a category and (ii) a set of constraints that instruct the AI system to generate the image prompts in a manner that causes depictions of people to be omitted from generated images that are generated using the image prompts; removing, from the image prompts generated by the AI system, at least one of the image prompts based on a set of excluded terms that are not allowed to be included in qualified image prompts, wherein removal of the at least one of the image prompts results in a set of qualified image prompts; generating, by the AI system, a set of generated images using the set of qualified image prompts; removing, from the set of generated images, one or more images that include excluded objects that are not allowed to be included in qualified images, wherein removal of the one or more images results in a set of qualified generated images; storing, in a data structure, the set of qualified generated images with data specifying the category; combining at least one qualified generated image from among the set of qualified generated images with other content, wherein the combining results in a new digital component; receiving a request for content in the category; transmitting, in response to the request, the new digital component to a client device.

These and other embodiments can each optionally include one or more of the following features. Methods can include the operations of comparing the set of generated images to a set of existing images; matching a given image, among the set of generated images, to a matching image in the set of existing images; and removing the given image from the set of generated images based on the matching, wherein removal of the given image results in the given image not being included in the set of qualified generated images.

Storing the set of qualified images with data specifying the category further can include storing each qualified image in the set of qualified images with (i) data specifying the category and (ii) dimensions of the qualified image.

Methods can include the operations of identifying, in the request for content, size data specifying available space for presentation of a digital component in an electronic resource; determining that the new digital component fits in the available space based on the size data; and selecting the new digital component for transmission in response to the request based on the determination that the new digital component fits in the available space.

Methods can include the operations of comparing a given generated image from among the set of generated images with a set of training images used to train the AI system; determining, based on the comparing, that the given generated image matches at least one training image in the set of training images; and in response to determining that the given generated image matches the at least one training image, excluding the given generated image from the set of qualified images.

Generating the image prompts can include generating the image prompts in a manner that causes one or more objects depicted by the output images to be oriented closer to a top or bottom of generated images.

Methods can include the operations of inputting a given qualified image having a current size to an uncrop model configured to create additional pixels of content for the given qualified image, wherein the additional pixels of content are added to at least one edge of the given qualified image based on a target size that differs from the current size of the given qualified image; and receiving an output of the uncrop model that includes a modified version of the given qualified image, wherein the modified version of the qualified image includes the additional pixels and has the target size; overlaying additional content over the additional pixels of the modified version of the given qualified image to create an augmented digital component; and distributing the augmented digital component over a network.

This specification describes techniques for enabling artificial intelligence (AI) to generate new digital components by combining an automatically generated image with other content (e.g., text, other images, or other content). There are a number of technical challenges faced when trying to automate the generation of images for particular topics/categories because of the nature of generative AI. For example, without mechanisms that constrain the manner in which generative AI models create new images, there is a likelihood that the images created for a given topic will be completely inappropriate, semantically unrelated to the given topic, or have a visual appearance that prevents/hinders user perception of the information intended to be conveyed.

In a specific example, assume that the text "The Big Game is Live Friday at the Coliseum" is the information intended to be textually conveyed in the new digital component. Further assume that the generative AI model creates a background image that includes depictions of people playing chess. In this example, it may be that the "Big Game" is an American Football Game, such that the depiction of the people playing chess in the generated image is semantically unrelated to the information to be conveyed. Further, the inclusion of human depictions may also be very distracting to a viewer, such that the viewer is less likely to receive the information intended to be conveyed to viewers (i.e., information about the Big Game.") As such, a technical problem to be solved can be conveyed as how to constrain (e.g., modify or configure) a generative AI system to generate images that are semantically related to a set of information to be conveyed and/or are not visually distracting to viewers of the new digital component. As discussed in more detail below, this problem can be solved through techniques that constrain the types of content that is generated by the generative AI system (e.g., using automatically generated constraints).

Another technical challenge faced when trying to automate the generation of images that will be combined with other content in a new digital component is related to the occlusion of objects and/or the ability to perceive the information being conveyed. For example, assume that another image generated for the "Big Game" example above is a depiction of a football located in the middle of image generated by the AI system. In this example when the text and/or other content is overlaid on the image, a portion (or all) of the football may be occluded, such that the viewer is unable to visually perceive the image of the football. In this example, the processing resources and compute time required to generate the image of the football have been wasted since the football is occluded by the other content. In another example, the image created by the AI system may have a color palate that does not have a sufficient level of contrast relative to the other content (e.g., the information to be conveyed) with which the generated image will be combined, such that the other content may not be readily discernable from the background image. In these situations, the creation of the new digital component (and the generated image) results in wasted computing resources and time because those resources and time have been utilized to generate imperceivable content, such that the system has failed to create the intended output. The processes discussed herein include operations that configure the AI system in a manner that can prevent output failures, for example, by ensuring sufficient contrast between the generated images and the information to be conveyed, as well as invoking techniques that ensure objects depicted in the images are at positioned at un-occluded locations within the generated image.

Another technical challenge faced when trying to automate the generation of images that will be combined with other content to create a new digital component is ensuring that the generated images are sufficiently visually unique relative to the training set of images used to train the AI system to generate images. For example, if the AI system is outputting images that are substantially the same as images used to train the AI system, the AI system is effectively operating as an image server, rather than a generative AI system that is creating new images. As discussed below, operations are performed to ensure that the images created by the AI system are sufficiently unique relative to the set of images used to train the AI system, thereby ensuring that the AI system is not functioning as an image server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
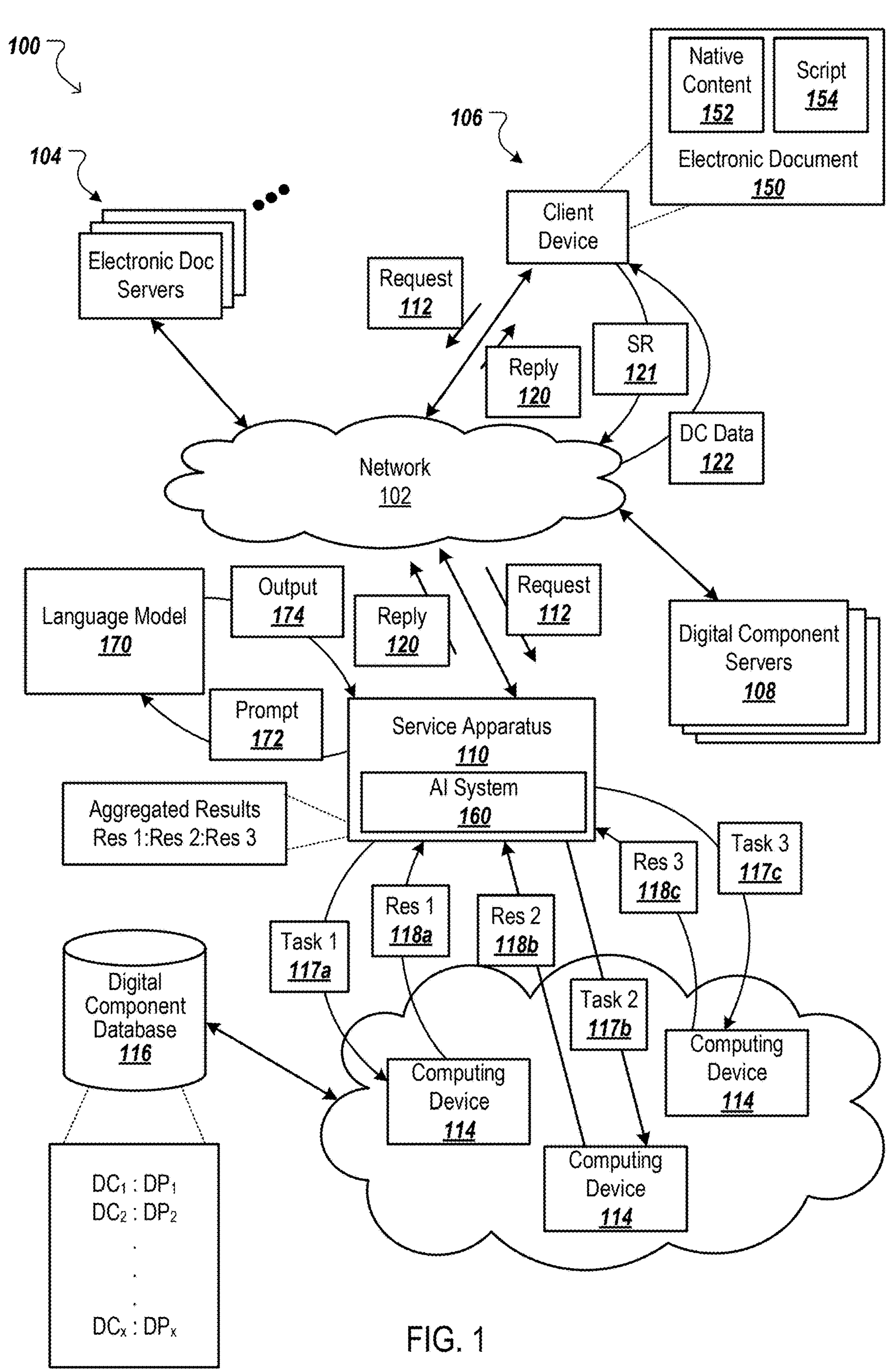
FIG. 1 is a block diagram of an example environment in which an artificial intelligence system can be implemented.

This specification describes techniques for enabling artificial intelligence (AI) to generate new digital components by combining an automatically generated image with other content (e.g., text, other images, or other content). Artificial intelligence is a segment of computer science that focuses on the creation of intelligent agents that can learn and act autonomously (e.g., without human intervention). Artificial intelligence systems can utilize one or more of (i) machine learning, which focuses on developing algorithms that can learn from data, (ii) natural language processing, which focuses on understanding and generating human language, and/or (iii) computer vision, which is a field that focuses on understanding and interpreting images and videos. Artificial intelligence systems can include generative models that generate new content (e.g., images/video, text, audio, or other content) in response to input prompts.

The techniques described throughout this specification enable the automated creation of new digital components, for example, by instructing a generative AI model to generate a background image that is appropriate for the topic/category of information to be conveyed. For example, if the category of the information to be conveyed by the new digital component is related to sports, the background image will be generated to have a visual appearance that is semantically related to sports content. Meanwhile, if the category of information to be conveyed by the new digital component is related to modern art, the background image generated for this category will differ from the sports-related background, and have a visual appearance that is semantically related to modern art.

To facilitate the generation of images for different categories of information, while also overcoming the technical challenges outlined in the Summary of this specification, the present techniques/system uses a set of constraints to generate image prompts. The generated image prompts are constructed/configured/structured in a manner that cause the AI system to generate images that do not include specified sets of objects (e.g., excluded objects). For example, the resulting image prompts may be constructed in a manner that instructs the AI system to omit objects that may be deemed distracting (e.g., people or animals) from generated images. In this way, the AI system is constrained in a way that will reduce/eliminate the generation of image prompts that result in the generation of the distracting objects.

The nature of generative AI is such that it is possible that the constraints will not completely prevent the AI system from generating prompts that include certain phrases that will result in the generation of the distracting objects. For example, depending on the training set used to train a generative AI model, the generative AI model may still generate image prompts that include the certain phrases. As such, the present AI system can utilize an image prompt filtering mechanism that evaluates the generated images prompts, and removes those prompts that include any excluded phrases (e.g., one or more terms) that are not allowed to be included in qualified image prompts. This image prompt filtering mechanism can be configured to remove, from the generated prompts, any prompts that include one or more of the excluded phrases. The result of removing these prompts is a set of qualified image prompts that are qualified as input prompts to a generative AI model configured to generate images based on text prompts.

A set of generated images are created using the set of qualified image prompts, and the set of generated images are evaluated to determine whether any of the images include excluded objects (e.g., distracting or prohibited objects) that are not allowed to be included in qualified images. When an excluded object is found in one of the generated images, that image is removed from the set of generated images, and after removal, the remaining images is considered a set of qualified images (e.g., images that do not include a prohibited/excluded object).

The set of qualified images are then stored in a data structure with data specifying the category for which the images were generated. These images can be combined with other content, such as text or other images, to create a new digital component that can be transmitted to a client device in response to a request for content in the category for which the images were generated. In some implementations, the combination of the images and the other content occurs prior to receipt of the request, and in other implementations, the images and the other content are combined after the request is received, as discussed in more detail below.

As used throughout this document, the phrase "digital component" refers to a discrete unit of digital content or digital information (e.g., a video clip, audio clip, multimedia clip, gaming content, image, text, combination of image and text, bullet point, artificial intelligence output, language model output, or another unit of content or unit of combined content). A digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an example environment 100 in which generative artificial intelligence can be implemented. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, and digital component servers 108.

A client device 106 is an electronic device capable of requesting and receiving online resources over the network 102. Example client devices 106 include personal computers, gaming devices, mobile communication devices, tablet devices, digital assistant devices, augmented reality devices, virtual reality devices, wearable devices, and other devices that can send and receive data over the network 102. A client device 106 typically includes a user application, such as a web browser, to facilitate the sending and receiving of data over the network 102, but native applications (other than browsers) executed by the client device 106 can also facilitate the sending and receiving of data over the network 102.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

As illustrated, the client device 106 is presenting an electronic document 150. An electronic document is data that presents a set of content at a client device 106. Examples of electronic documents include webpages, word processing documents, portable document format (PDF) documents, images, videos, search results pages, and feed sources. Native applications (e.g., "apps" and/or gaming applications), such as applications installed on mobile, tablet, or desktop computing devices are also examples of electronic documents. Electronic documents can be provided to client devices 106 by electronic document servers 104 ("Electronic Doc Servers").

For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally (i.e., on the client device). Alternatively, or additionally, the client device 106 can initiate a request to execute the app, which is transmitted to a cloud server. In response to receiving the request, the cloud server can execute the application and stream a user interface of the application to the client device 106 so that the client device 106 does not have to execute the app itself. Rather, the client device 106 can present the user interface generated by the cloud server's execution of the app, and communicate any user interactions with the user interface back to the cloud server for processing.

Electronic documents can include a variety of content. For example, an electronic document 150 can include native content 152 that is within the electronic document 150 itself and/or does not change over time. Electronic documents can also include dynamic content that may change over time or on a per-request basis. For example, a publisher of a given electronic document (e.g., electronic document 150) can maintain a data source that is used to populate portions of the electronic document. In this example, the given electronic document can include a script, such as the script 154, that causes the client device 106 to request content (e.g., a digital component) from the data source when the given electronic document is processed (e.g., rendered or executed) by a client device 106 (or a cloud server). The client device 106 (or cloud server) integrates the content (e.g., digital component) obtained from the data source into the given electronic document to create a composite electronic document including the content obtained from the data source.

In some situations, a given electronic document (e.g., electronic document 150) can include a digital component script (e.g., script 154) that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., third-party content, such as video files, audio files, images, text, gaming content, augmented reality content, and combinations thereof, which can all take the form of advertising content or non-advertising content) that will be presented with the given electronic document (e.g., at a location specified by the script 154) in response to receiving the component request 112 and/or using information included in the component request 112.

In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106.

Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords/topics/categories that must be matched (e.g., by electronic documents, document keywords, or terms specified in the component request 112) in order for the digital component to be eligible for presentation. Additionally, or alternatively, the distribution parameters can include embeddings that can use various different dimensions of data, such as website details and/or consumption details (e.g., page viewport, user scrolling speed, or other information about the consumption of data). The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, or some other specified value) that is used for evaluating the eligibility of the digital component for distribution/transmission (e.g., among other available digital components).

The identification of the eligible digital component can be segmented into multiple tasks 117*a*-117*c* that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118*a*-118*c* of the analysis back to the service apparatus 110.

For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components (e.g., winning third-party content) and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

When the client device 106 receives the digital component data 122, the client device will render the digital component (e.g., third-party content), and present the digital component at a location specified by, or assigned to, the script 154. For example, the script 154 can create a walled garden environment, such as a frame, that is presented within, e.g., beside, the native content 152 of the electronic document 150. In some implementations, the digital component is overlayed over (or adjacent to) a portion of the native content 152 of the electronic document 150, and the service apparatus 110 can specify the presentation location within the electronic document 150 in the reply 120. For example, when the native content 152 includes video content, the service apparatus 110 can specify a location or object within the scene depicted in the video content over which the digital component is to be presented.

The service apparatus 110 can also include an artificial intelligence system 160 configured to autonomously generate digital components, either prior to a request 112 (e.g., offline) and/or in response to a request 112 (e.g., online or real-time). The artificial intelligence ("AI") system 160 can collect online content about a specific entity (e.g., digital component provider or another entity) and summarize the collected online content using one or more language models 170, which can include large language models. Note that the language model 170 is depicted as being separate from the service apparatus 110 and the AI system 160, but the language model 170 can be integrated into the service apparatus 110 and/or the AI system 160.

A large language model ("LLM") is a model that is trained to generate and understand human language. LLMs are trained on massive datasets of text and code, and they can be used for a variety of tasks. For example, LLMs can be trained to translate text from one language to another; summarize text, such as web site content, search results, news articles, or research papers; answer questions about text, such as "What is the capital of Georgia?"; create chatbots that can have conversations with humans; and generate creative text, such as poems, stories, and code.

The language model 170 can be any appropriate language model neural network that receives an input sequence made up of text tokens selected from a vocabulary and auto-regressively generates an output sequence made up of text tokens from the vocabulary. For example, the language model 170 can be a Transformer-based language model neural network or a recurrent neural network-based language model.

In some situations, the language model 170 can be referred to as an auto-regressive neural network when the neural network used to implement the language model 170 auto-regressively generates an output sequence of tokens. More specifically, the auto-regressively generated output is created by generating each particular token in the output sequence conditioned on a current input sequence that includes any tokens that precede the particular text token in the output sequence, i.e., the tokens that have already been generated for any previous positions in the output sequence that precede the particular position of the particular token, and a context input that provides context for the output sequence.

For example, the current input sequence when generating a token at any given position in the output sequence can include the input sequence and the tokens at any preceding positions that precede the given position in the output sequence. As a particular example, the current input sequence can include the input sequence followed by the tokens at any preceding positions that precede the given position in the output sequence. Optionally, the input and the current output sequence can be separated by one or more predetermined tokens within the current input sequence.

More specifically, to generate a particular token at a particular position within an output sequence, the neural network of the language model 170 can process the current input sequence to generate a score distribution (e.g., a probability distribution) that assigns a respective score, e.g., a respective probability, to each token in the vocabulary of tokens. The neural network of the language model 170 can then select, as the particular token, a token from the vocabulary using the score distribution. For example, the neural network of the language model 170 can greedily select the highest-scoring token or can sample, e.g., using nucleus sampling or another sampling technique, a token from the distribution.

As a particular example, the language model 170 can be an auto-regressive Transformer-based neural network that includes (i) a plurality of attention blocks that each apply a self-attention operation and (ii) an output subnetwork that processes an output of the last attention block to generate the score distribution.

The language model 170 can have any of a variety of Transformer-based neural network architectures. Examples of such architectures include those described in J. Hoffmann, S. Borgeaud, A. Mensch, E. Buchatskaya, T. Cai, E. Rutherford, D. d. L. Casas, L. A. Hendricks, J. Welbl, A. Clark, et al. Training compute-optimal large language models, arXiv preprint arXiv: 2203.15556, 2022; J. W. Rae, S. Borgeaud, T. Cai, K. Millican, J. Hoffmann, H. F. Song, J. Aslanides, S. Henderson, R. Ring, S. Young, E. Rutherford, T. Hennigan, J. Menick, A. Cassirer, R. Powell, G. van den Driessche, L. A. Hendricks, M. Rauh, P. Huang, A. Glaese, J. Welbl, S. Dathathri, S. Huang, J. Uesato, J. Mellor, I. Higgins, A. Creswell, N. McAleese, A. Wu, E. Elsen, S. M. Jayakumar, E. Buchatskaya, D. Budden, E. Sutherland, K. Simonyan, M. Paganini, L. Sifre, L. Martens, X. L. Li, A. Kuncoro, A. Nematzadeh, E. Gribovskaya, D. Donato, A. Lazaridou, A. Mensch, J. Lespiau, M. Tsimpoukelli, N. Grigorev, D. Fritz, T. Sottiaux, M. Pajarskas, T. Pohlen, Z. Gong, D. Toyama, C. de Masson d'Autume, Y. Li, T. Terzi, V. Mikulik, I. Babuschkin, A. Clark, D. de Las Casas, A. Guy, C. Jones, J. Bradbury, M. Johnson, B. A. Hechtman, L. Weidinger, I. Gabriel, W. S. Isaac, E. Lockhart, S. Osindero, L. Rimell, C. Dyer, O. Vinyals, K. Ayoub, J. Stanway, L. Bennett, D. Hassabis, K. Kavukcuoglu, and G. Irving. Scaling language models: Methods, analysis & insights from training gopher. CoRR, abs/2112.11446, 2021; Colin Raffel, Noam Shazeer, Adam Roberts, Katherine Lee, Sharan Narang, Michael Matena, Yanqi Zhou, Wei Li, and Peter J Liu. Exploring the limits of transfer learning with a unified text-to-text transformer. arXiv preprint arXiv: 1910.10683, 2019; Daniel Adiwardana, Minh-Thang Luong, David R. So, Jamie Hall, Noah Fiedel, Romal Thoppilan, Zi Yang, Apoorv Kulshreshtha, Gaurav Nemade, Yifeng Lu, and Quoc V. Le. Towards a human-like open-domain chatbot. CoRR, abs/2001.09977, 2020; and Tom B Brown, Benjamin Mann, Nick Ryder, Melanie Subbiah, Jared Kaplan, Prafulla Dhariwal, Arvind Neelakantan, Pranav Shyam, Girish Sastry, Amanda Askell, et al. Language models are few-shot learners. arXiv preprint arXiv: 2005.14165, 2020.

Generally, however, the Transformer-based neural network includes a sequence of attention blocks, and, during the processing of a given input sequence, each attention block in the sequence receives a respective input hidden state for each input token in the given input sequence. The attention block then updates each of the hidden states at least in part by applying self-attention to generate a respective output hidden state for each of the input tokens. The input hidden states for the first attention block are embeddings of the input tokens in the input sequence and the input hidden states for each subsequent attention block are the output hidden states generated by the preceding attention block.

In this example, the output subnetwork processes the output hidden state generated by the last attention block in the sequence for the last input token in the input sequence to generate the score distribution.

Generally, because the language model is auto-regressive, the service apparatus 110 can use the same language model 170 to generate multiple different candidate output sequences in response to the same request, e.g., by using beam search decoding from score distributions generated by the language model 170, using a Sample-and-Rank decoding strategy, by using different random seeds for the pseudo-random number generator that's used in sampling for different runs through the language model 170 or using another decoding strategy that leverages the auto-regressive nature of the language model.

In some implementations, the language model 170 is pre-trained, i.e., trained on a language modeling task that does not require providing evidence in response to user questions, and the service apparatus 110 (e.g., using AI system 160) causes the language model 170 to generate output sequences according to the pre-determined syntax through natural language prompts in the input sequence.

For example, the service apparatus 110 (e.g., AI system 160), or a separate training system, pre-trains the language model 170 (e.g., the neural network) on a language modeling task, e.g., a task that requires predicting, given a current sequence of text tokens, the next token that follows the current sequence in the training data. As a particular example, the language model 170 can be pre-trained on a maximum-likelihood objective on a large dataset of text, e.g., text that is publicly available from the Internet or another text corpus.

In some implementations, the AI system 160 can generate a prompt 172 that is submitted to the language model 170, and causes the language model 170 to generate the output sequences 174, also referred to as "output". The AI system 160 can generate the prompt in a manner (e.g., having a structure) that identifies a list of online sources of information, such as a list of websites or data repositories, and specifying a set of constraints the language model 160 must use to generate a summary of information found at the online sources specified in the prompt 172. To initiate creation of the output sequences 174, the AI system 160 submits the prompt 172 to the one or more language models 170, which use the prompt 172 to evaluate the information found at the online sources specified in the prompt 172, and generate the output 174 that summarizes the information according to the constraints specified in the prompt 172.

In some implementations, the collected information can be used to classify entities into a hierarchical semantic structure. For example, based on the information collected for one entity, or a subset of available resources, the output 174 can be a categorization/sub-categorization of the information collected. In a specific example, assume that a set of resources (e.g., online web pages or files) is related to a bakery specializing in birthday cakes. In this example, the information collected can be used to assign the set of resources (e.g., for a particular entity) to the category of "bakery" and sub-category "birthday cakes" that is a sub-category of "bakery." In this way, the category to which a given set of resources is semantically related can be determined, assigned to the set of resources and/or entity, and used as, at least part of, a summary of the set of resources and/or the entity. Note that the phrase category, as used herein, can be used to refer to both categories and sub-categories, and the term sub-category is used to differentiate a subordinate from a more general category to which the sub-category belongs.

The AI system 160 can use the generated summary (e.g., the category) to generate another prompt (not shown) that is sent to the language model 170. For example, the AI system 160 can insert the generated summary into an additional prompt (e.g., a prompt generated after receiving the summary) that is submitted to the language model 170 (or another language model) as a constraint for generating image prompts. The image prompts generated by the language model are constructed/configured to be input to an image generation model (e.g., a language model configured to generate and output images). In some implementations, the language model 170 generates the image prompts based on a specified category (e.g., derived from the generated summary), and a set of constraints that limit the generation of the image prompts by the language model 170. In some implementations, the set of constraints instruct the AI system to generate the image prompts in a manner that causes distracting and/or prohibited objects to be omitted from output images generated using the image prompts. In other words, the set of constraints can instruct the language model 170 to avoid including references to the distracting and/or prohibited objects in the image prompts generated by the language model 170. In a specific example, the set of constraints can instruct the language model 170 to exclude people or animals.

The set of constraints can also include instructions for the language model 170 to format the image prompt according to a specified template, such as "Format the prompt as follows: A (style) image (context and background). The set of constraints can also instruct the language model 170 regarding a set of general image styles that can be specified (e.g., painting, photographic, sketches, etc.), as well as a set of more specific image styles that can be specified (e.g., pastel painting, charcoal drawing, isometric 3D, etc.). The set of constraints can further include additional options related to the various styles that could be included in the prompt generated by the language model 170. For example, with respect to the style of photography, the set of constraints could specify that a prompt for that style could include one or more of camera proximity (close up or far away from objects), camera position (arial or from below), camera lenses, camera settings, lighting, film type, etc. An example input to the language model could take the form of:

What is a good prompt for a background image related to the input category? Try not to include people or animals.

Consider formatting the prompt as follows: A (style) background (context and background).

Styles can be general (painting, photograph, sketches, . . . ) or very specific (pastel painting, charcoal drawing, isometric 3D, . . . ).

Also consider using photography modifiers: camera proximity (Close up, taken from far away), camera position (aerial, from below), lens types (35 mm, 50 mm, fisheye, wide angle, macro), camera settings (motion blur, soft focus, bokeh, portrait), lighting (natural, dramatic, warm, cold), film types (black and white, polaroid).

Input: {category} ##Output:

When the category and set of constraints are submitted to the language model 170, which is an AI system, the language model 170 can generate multiple different image prompts using the category and set of constraints. Examples of image prompts for different categories can include:

| Category | Generated Image Prompt |
|---|---|
| Publishing | A warm toned, abstract painting of books stacked on a shelf |
| Cars & Trucks | A stylized photograph of a vintage car taken from the side, with a blurred background of city lights |
| Business News & Media | A digital painting of a city skyline at dusk, with the skyscrapers lit up in different colors |

The image prompts generated by the language model 170 can be returned to the service apparatus 110 (e.g., the AI system 160), and evaluated. For example, each of the image prompts can be examined to determine whether the image prompt includes any excluded terms. As used in this specification, excluded terms refers to a set of terms that are not allowed to be included in qualified image prompts (e.g., image prompts that are qualified/approved to be submitted to an image generation model). For example, excluded terms can be terms that reference the distracting/prohibited objects discussed above. Excluded terms can also include other terms, such as offensive terms. More generally, an excluded term is a term that is not allowed to be included in qualified image prompts. More generally, qualified image prompts are image prompts that do not violate a set of pre-specified rules/conditions that are required to be complied with (e.g., by an administrator of the system) in order for the image prompts to be submitted to an image generation model to create new images.

The excluded terms can be maintained in a data structure, such that the excluded terms can be compared to the generated image prompts. When a match between an excluded term and one or more terms of the image prompt is detected, the image prompt containing the excluded term can be removed from the set of image prompts generated by the language model 170. The set of image prompts remaining after removing the image prompts containing excluded terms can be considered a set of qualified image prompts.

Evaluating and removing image prompts to arrive at the set of qualified image prompts prior to generating the output images saves a tremendous amount of time and processing resources that otherwise would have been wasted generating images using those image prompts that were not included in the set of qualified image prompts. For example, the system discussed herein is intended for widespread use by millions of entities. As such, if even ten non-qualified image prompts were processed to generate one additional image each for each entity each day, that would result in 10s, if not 100s, of millions of additional generated images that would simply be discarded if evaluation were to be performed after the generation of the images. This would result in a large amount of wasted computing resources, just to generate the images, and even more wasted computing resources to then evaluate the generated images, as discussed in more detail below. As such, performing the evaluation and removal of generated image prompts to arrive at the qualified set of image prompts prior to generating the output images results in a substantial savings in processing resources and time.

The set of qualified image prompts can be submitted, as input, to an image generation model (not shown). The image generation model can be a language model that is configured to accept, as input, textual prompts, and generate output image based on the textual prompts. The image generation model can be implemented, for example, as part of the language model 170, the AI system 160, or another generative AI model that has been trained to generate output images based on a text input, such as the generated image prompts. Note that the phrase "image prompt" refers to a prompt configured for input to an image generation model. Although the image prompt could include an image, it need not include an image, and can contain text, either in part, or completely.

The images generated by the image generation model are provided back to the service apparatus 110 and/or AI system 160 for evaluation. As noted above, despite the fact that the qualified image prompts were evaluated to ensure they did not contain excluded terms and create the set of qualified image prompts, the somewhat unpredictable nature of generative models leaves open the possibility that one or more of the generated images still includes excluded objects (e.g., the distracting or prohibited objects discussed above). Therefore, to prevent images including the excluded objects from being used to create new digital components that are then distributed to client devices, the service apparatus 110 and/or AI system 160 can evaluate the generated images to identify any generated images that include excluded objects. The phrase "excluded objects" refers to objects that are not allowed to be included in qualified images (e.g., images that are qualified to be used to create new digital components). The set of excluded objects can be pre-specified, for example, by an administrator of the system, such that the system can reference the pre-specified list to determine whether images include excluded objects.

In some implementations, the evaluation of the generated images includes performing object recognition on the content of the output images. For example, the generated images can be input to models that are each trained to identify one or more of the excluded objects in images. When the output of one of the object recognition models indicates that a given image includes an excluded object, the given image is removed from the set of generated images. Once evaluation of the generated images is complete, and images containing excluded objects are removed from the set of generated images, the remaining images can be considered a set of qualified generated images that are available for use in creating new digital components.

The set of qualified generated images can be stored in a data structure of the digital component database, or in a database similar to the digital component database 116. In some implementations, each qualified image in the set of qualified generated images can be stored with metadata specifying the category for which the qualified generated image was generated. For example, assume that the image prompt used to generate a given qualified generated image was generated using an image prompt created by the language model 170, and that the image prompt was created based on the category "sports". In this example, the given qualified generated image can be considered to have been created for the category "sports" and stored in the data structured with (e.g., indexed to) data specifying the category of "sports".

The service apparatus 110 and/or AI system 160 can combine a given qualified generated image from among the set of qualified generated images with other content to create a new digital component. For example, assume that the text "The Big Game is Live Friday at the Coliseum" is available to be combined with a qualified generated image that was created for the category "sports." In this example, the service apparatus 110 and/or AI system 160 can overlay the text over the qualified generated image to create the new digital component. In turn, the new digital component can be made available for distribution in response to a request for content in the category "sports".

For example, the new digital component can be stored in the digital component database 116 with a reference to the category for which the qualified generated image of the new digital component was created (e.g., sports in this example). When the service apparatus 110 receives a request for content specifying the category, the digital component database 116 can be searched to identify the match between the category in the request and the category to which the new digital component is indexed. Based on the match, the service apparatus 110 can select the new digital component for distribution, and transmit the new digital component to a client device in response to the request.

The description above refers to the new digital component being created prior to receipt of the request. However, in some implementations, the new digital component can be created after the service apparatus 110 receives the request for content in the category. For example, as previously discussed the set of qualified generated images generated for a given category can be stored with data specifying the given category. Similarly, text available for distribution in response to content requests specifying the given category can be stored in a database with data specifying the given category. In this example, when the service apparatus 110 receives the content request specifying the given category, the service apparatus 110 can use the given category to search databases for images and text that are each stored with data specifying the given category. When an image and text are identified using the given query, the image and text can be combined to create the new digital component, which is then transmitted to the client device in response to the content request. In this way, the creation of the new digital component can be dynamic in nature, and can therefore, leverage other information in the request that may not be known prior to receipt of the request (e.g., a time of day of the request). This dynamic creation of the new digital components can also reduce the storage requirements of pre-generating the new digital components because only one instance of each qualified generated image and one instance of each set of text needs to be stored, while still being able to create all combinations of text and images as new digital components.

Figure 2:
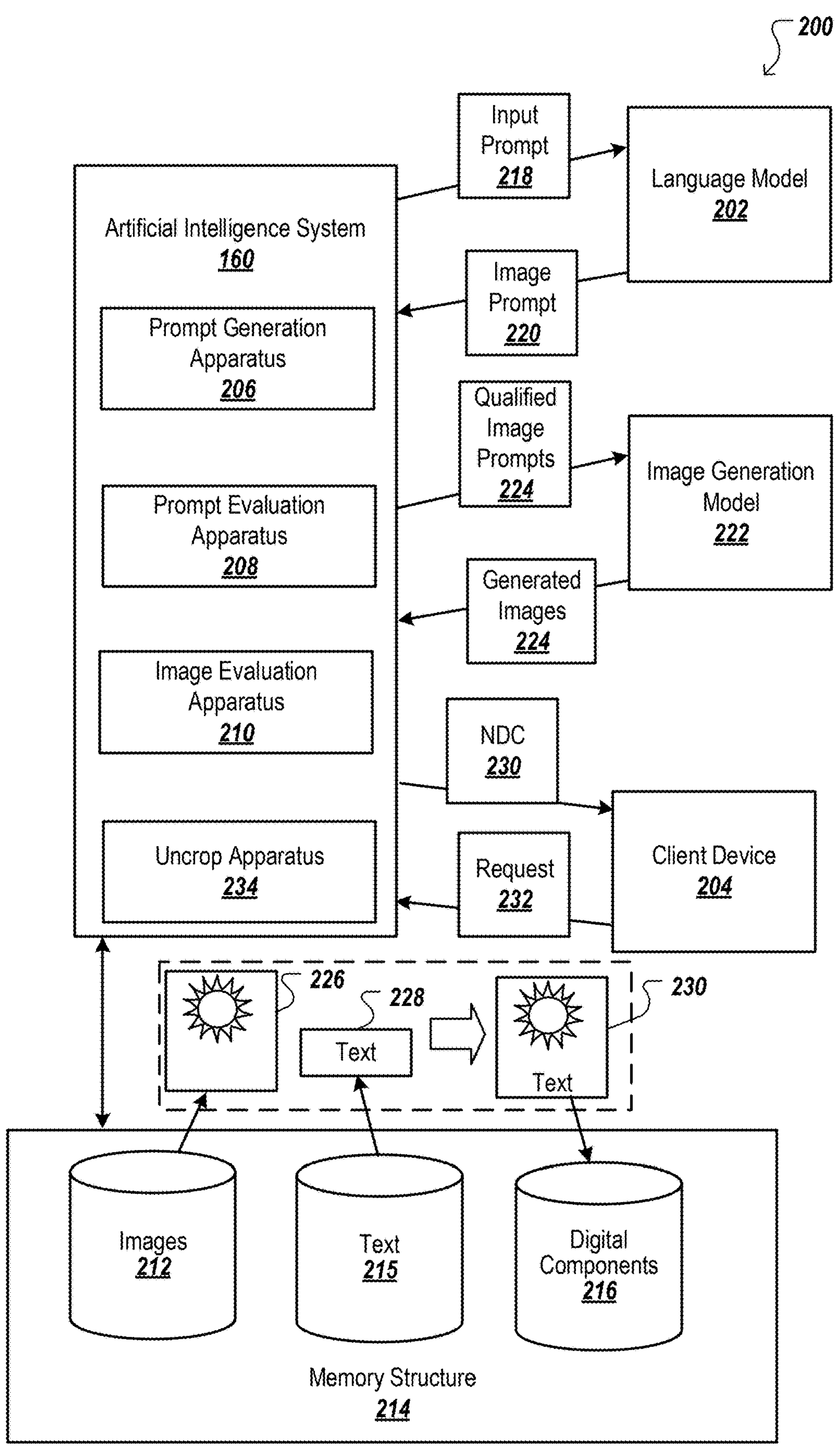
FIG. 2 is a block diagram illustrating interactions that facilitate the automated generation of images on a per-category basis.

FIG. 2 is a block diagram illustrating interactions that facilitate the automated generation of images on a per-category basis. In some situations, the language model 202 and client device 204 can, respectively, be the same or similar to the language model 170 and client device 106 of FIG. 1. Although a single language model 202 is depicted in FIG. 2, the language model 202 can be a set of different language models that can be invoked for different tasks for which the different language models are specially trained. For example, one language model within the set of language models may be specially trained to perform content summary tasks, while another model may be specially trained to generate an image prompt given a category and/or other information. Furthermore, the set of models can include a generalized language model that is larger is size, and capable of generating large amounts of diverse datasets, but this generalized model may have higher latency than the specialized models, which can make it less desirable for use in real-time operations, depending on time latency constraints required to generate content.

The artificial intelligence system 160 includes prompt generation apparatus 206, a prompt evaluation apparatus 208, and an image evaluation apparatus 210. The following description refers to these different apparatuses as being implemented independently and each configured to perform a set of operations, but any of these apparatuses could be combined to perform the operations discussed below. Furthermore, the transmissions of data between various components can occur over any communications bus or network.

The artificial intelligence system 160 is in communication with a memory structure 214. The memory structure 214, can include one or more databases. As shown, the memory structure includes an images database 212, a text database 215, and a digital components database 216. Each of these databases 212, 215, and 218, can be implemented in a same hardware memory device, separate hardware memory devices, and/or implemented in a distributed cloud computing environment.

The prompt generation apparatus 206 is implemented using at least one computing device (e.g., one or more processors), and can include one or more language models. The prompt generation apparatus 206 is configured to generate an image prompt based on a category and a set of constraints. As discussed above, the set of constraints are used to instruct the AI system to generate the image prompts in a manner that causes depictions of excluded objects (e.g., people) to be omitted from output images generated using the image prompts. In other words, the set of constraints are instructions that guide the image generation model away from generating images that include the excluded objects. For brevity, the discussion of generating the image prompts from FIG. 1 is not repeated here. Rather, the description from FIG. 1 can be referenced, and can be performed by the prompt generation apparatus 206.

In some implementations, the prompt generation apparatus 206 is configured to generate the image prompts in a manner that causes one or more objects depicted by the output images to be oriented (e.g., located or positioned) closer to a top or a bottom of the generated images. For example, the constraints used to generate the image prompt can include a constraint instructing the image generation model as to the location of objects in the generated image and/or to leave empty space (e.g., space devoid of objects) at another location. In a specific example, the constraints used to generate the image prompt can include an object location constraint such as "<object description> bottom center of image, with a large area of empty space at the top for text.", with final the goal of having the image generation model leave a region for text at the top of the generated images.

In this example, the "<object description>" of the object location constraint is instructing the language model 202 that the data that follows is specifying information about the requested format/description of the location of the objects depicted by images generated by the image generation model. The remaining text of the example constraint is instructing the language model 202 that the prompt generated by the language model should include a constraint that instructs the image generation model to place the object at the bottom center of the image and to leave empty space at the top of the image for text that will be subsequently inserted. Requesting the language model 202 to generate an image prompt instructing the image generation model in this way can result in generation of an image in which the object depicted by the image will not be occluded/overlapped by the text that is subsequently added, thereby improving the effectiveness of the generated image, and ensuring that the resources used to generate the image are not wasted by having the object partially or completely covered by later added content, such as text.

The prompt generation apparatus 206/AI system 160 can submit the category and constraints to the language model as an input prompt requesting the language model to generate image prompts based on the category and the set of constraints, as discussed above with reference to FIG. 1. The language model 202 processes the input prompt and outputs image prompts 220 that are provided back to the artificial intelligence system 160 for evaluation. The evaluation of the image prompts 220 can be performed, for example, by the prompt evaluation apparatus 208.

The prompt evaluation apparatus 208 is implemented using at least one computing device (e.g., one or more processors), and can optionally include one or more language models. The prompt evaluation apparatus 208 is configured to evaluate the image prompts 220 generated by the language model 202. For example, as discussed above with reference to FIG. 1, the prompt evaluation apparatus 208 can determine whether any of the image prompts 220 includes an excluded term, and prevent those image prompts that include the excluded terms from being included in a set of qualified image prompts that are eligible for submission to an image generation model 222, also referred to as an image model.

In some implementations, the prompt evaluation apparatus 208 can compare each term in each of the image prompts 220 to a list of excluded terms. When a match is detected, the image prompt 220 that contained the term matching a term in the list of excluded terms can be removed from consideration as a qualified image prompt. When all image prompts 220 that contain excluded terms have been removed from consideration as a qualified image prompt, the image prompts remaining can be classified as qualified image prompts 224 that are eligible for submission to the image model 222.

The AI system 160 can submit the qualified image prompts 224 to the image model 222. The image model is a generative AI model that has been trained to generate images based on text input, such as the text contained in the qualified image prompts 224. The generated images are transmitted by back to, and received by, the AI system 160.

The generated images are evaluated by the image evaluation apparatus 210 of the AI System 160. The image evaluation apparatus 210 is implemented using at least one computing device (e.g., one or more processors), and can optionally include one or more language models. As discussed above with reference to FIG. 1, the image evaluation apparatus can perform object detection on the generated images 224 to determine whether any of the generated images includes an excluded object. For example, the image evaluation apparatus 210 can identify objects in each of the generated images 224 and compare the list of identified objects to a list of excluded objects. When a match between the identified objects in the generated images and the excluded objects is found, the generated image that included the object matching an excluded object is removed from consideration as a qualified generated image eligible for distribution. The generated images remaining after removing images that contain an excluded object can be considered a set of qualified generated images that are eligible for inclusion in new digital components and/or distribution.

In some implementations, the removal of an image from consideration can include removing the image from the set of generated images, such that the removed image is no longer stored. Furthermore, the decision to remove an image can be based on a comparison of the generated images to a set of existing images rather than, or in addition to, the object detection and excluded object matching discussed above. For example, in situations where a given image among the set of generated images is compared to a set of existing images, and matches one of the images in the set of existing images, the given image can be removed from the set of generated images based on that match. As such, the given image will not be included in the set of qualified generated images. This image matching process can be used to identify duplicate images that have been generated by the image generation model 222, such that removal of the duplicate image (e.g., the generated image determined to match an existing image) saves memory resources by not storing multiple instances of the same image.

In some implementations, a comparison of a given generated image to a set of existing images can be used to ensure that the images included in the set of qualified generated images are not duplicates of training images that were used to train the image generation model 222. As discussed above, the image generation model 222 (and AI system 160) are configured to generate new images and digital components, so the images output by the image generation model should ideally not match any of the training images that were used to train the image generation model. To ensure that the generated images 224 are unique relative to the training images, the image evaluation apparatus 210 can compare each given generated image (e.g., output image of the image generation model) to the set of training images used to train the image generation model, which can be part of the AI system 160. Based on the comparison, the image evaluation apparatus 210 determines whether each given generated image matches at least one of the training images. In response to determining that a given generated image matches at least one training image, the given generated image is excluded from the set of qualified generated images, also referred to as qualified images.

The AI system 160 can store the set of qualified images in the images database 212 of the memory structure 214. In some implementations, each of the qualified images in the set can be stored with data specifying the category for which the qualified image was generated. For example, as discussed above, each of the qualified images can be stored with the category used to generate the qualified image prompt 224 that was input to the image generation model 222 to generate the qualified image. Storing the qualified images with the category used to generate the qualified image enables quick lookup of images responsive to a category included in a request for content. For example, assume that a request for content 232 ("request") includes the category "sports". In this example, the AI system 160 and/or service apparatus 110 of FIG. 1 can use the category "sports" from the request for content 232 as a search token to search the image database 212 for images, and select one or more images that are stored with the category "sports".

In some implementations, each of the qualified images can also be stored with data specifying dimensions, aspect ratios, or other indications of the size of the qualified image. In these implementations, the search for an image can be extended to identify images that are stored with the category included in the request for content 232 as well as those images having a specified set of dimensions. For example, assume that the request for content specifies that the dimensions of the space in which a selected image will be presented is A×B pixels. In this example, the search for an image to transmit to the client device in response to the request can identify those images that are stored with the specified category, and are stored with dimensions that fit within the A×B space that is available for presentation of the selected image. In this way, the system will not select an image that won't fit in the available space, even though the image was created for the category specified in the request for content 232 received from the client device.

The AI system 160 and/or service apparatus 110 of FIG. 1 can combine at least one of the qualified images 224 with other content to create a new digital component. For example, the AI system 160 can combine a qualified image 226 stored in the image database 212 with text 228 stored in the text database 215 to create a new digital component 230 that includes both of the image 226 and the text 228. In some implementations, the AI system 160 can create the new digital component 230 by overlaying the text 228 over the image 226. The location of the text 228 can be selected so that an object (e.g., the sun in this example) in the image 226 is not occluded by the text 228. For example, the location of the text 228 can be changed until there is at least one pixel (or a specified number of pixels) of the image between an edge of the object depicted by the image 226 and the edge of the text 228. Once the new digital component 230 is created, it can be stored in the digital components database 216. In some implementations, the new digital component 230 can be stored with the category for which the image 226 was generated and/or the dimensions (or other size information) as discussed above. Again, this can help facilitate efficient selection of an appropriate digital component to transmit to the client device 204 in response to a request for content 232 received from the client device 204.

For example, when the request for content 232 is received, aspect ratio data, dimensions, or other indications of the space available for presentation of a digital component in an electronic resource can be identified. More specifically, in some situations, the request for content may specify that the space in the electronic document that is available for presentation of a digital component is an A×B pixel space. In these situations, the AI system 160 can determine whether the new digital component 230 fits in the available space based on the aspect ratio, dimensions, or other indications of space available (e.g., based on a comparison of the space available and the stored size information for the new digital component 230). In response to determining that the new digital component 230 will fit in the available space, the AI system 160 can select the new digital component 230 for presentation, and transmit the new digital component 230 to the client device 204.

The creation of the new digital component 230 can also be performed prior to the receipt of the request for content 232 from the client device 204, or after the request for content 232 has been received. For example, as discussed above, a set of new digital components (e.g., including the digital component 230) can be created and stored for later distribution independent of any request for content from a client device.

Alternatively, the new digital component 230 can be created in response to receipt of the request for content 232 from the client device 204 in a manner similar to that discussed above with reference to FIG. 1. For example, when the request for content 232 is received, the category and/or dimensions specified therein can be identified and used to select (i) one or more images from the images database 212 and (ii) one or more phrases from the text database 215. As previously discussed, additional information, such as a time of day, device type of the client device 204, or other information can be used during the selection of the image 226 and/or text 228. Once the image 226 and text 228 have been selected, they can be combined to create the new digital component 230 ("NDC"), which can then be transmitted to the client device 204. In these implementations, the new digital component 230 can also be stored in the digital components database 216, and used again later for distribution to other client devices 204, thereby reducing the need to recreate the new digital component 230 in response to a subsequent request for content.

In some situations, the space in the electronic document that is available for presentation of the new digital component 230 may be larger than the size of the new digital component 230. In these situations, the AI system 160 can include, or otherwise input, to an uncrop apparatus 234, the image 226 and/or the new digital component 230 to increase a size of the image 226 or new digital component 230 to a target size that differs from the current size of the image 226 or the new digital component. The uncrop apparatus 230 includes an uncrop model (e.g., generative model) that is configured to create additional pixels of content for an image, thereby extending at least one dimension of the image. For example, the additional pixels can be added to at least one edge of the image 226 based on the target size (e.g., the size of the available space), to extend the image 226 beyond the original edges of the image 226. In this way, the image 226 can be available for presentation in multiple different sized spaces.

In operation, the AI system 160 can input the image 226 into the uncrop apparatus 234, and receives, as output from the uncrop apparatus 234 a modified version of the image that includes additional pixels relative to the image 226, and has the target size. The AI system 160 can then overlay additional content over the additional pixels of the modified version of the image to create an augmented digital component having a different size than the new digital component 230. That augmented digital component can then be distributed over a network (e.g., to the client device 204).

Figure 3:
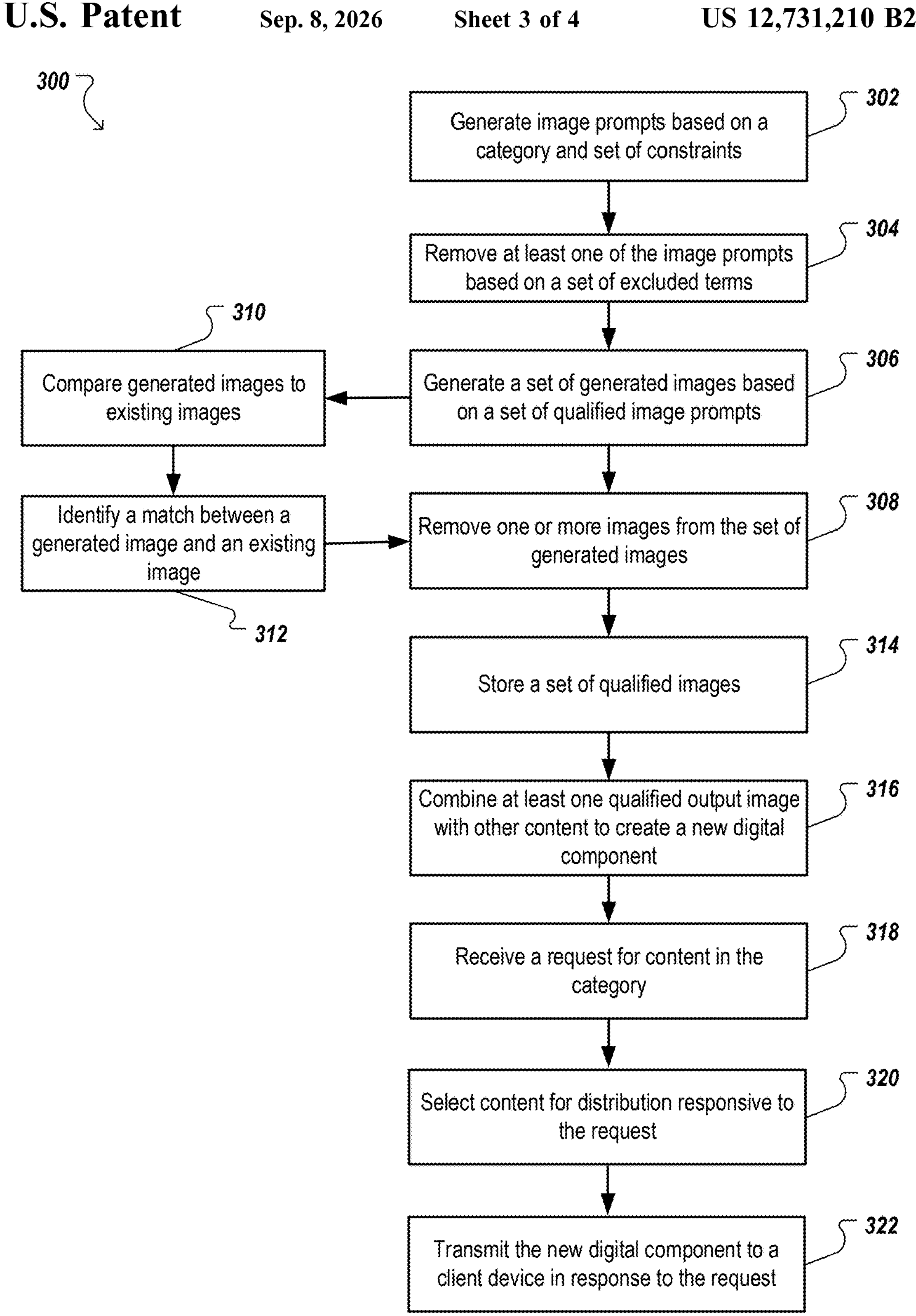
FIG. 3 is a flow chart of an example process for automated generation of images on a per-category basis.

FIG. 3 is a flow chart of an example process 300 for automated generation of background images on a per-category basis. Operations of the process 300 can be performed, for example, by the service apparatus 110 of FIG. 1 (e.g., including the AI system 160 and/or language model 170), or another data processing apparatus. The operations of the process 300 can also be implemented as instructions stored on a computer readable medium, which can be non-transitory. Execution of the instructions, by one or more data processing apparatus, cause the one or more data processing apparatus to perform operations of the process 300.

Image prompts are generated based on a category and a set of constraints (302). In some implementations, the set of constraints cause the AI system to be instructed to generate image prompts in a manner that causes depictions of excluded objects from generated images that are generated using the image prompts. For example, the set of constraints can cause the AI system to be instructed to exclude depictions of people, animals, or other objects that may be visually distracting from information being conveyed by a digital component that includes the generated images. In a specific example, assume that the set of constraints indicates that generated images should not include depictions of people. In this example, the image prompts can be generated based on instructions such as "avoid including people in the generated images," which instructs the AI system (e.g., a language model) to generate image prompts that will cause an image generation model to generate images that exclude depictions of people. For example, in the context of a "publishing" category, the AI system can generate an image prompt such as "Generate a warm toned, abstract painting of books stacked on a shelf," which will cause the image generation model to generate a corresponding image that excludes/omits a person from being depicted by the generated image.

The set of constraints (or other criteria) can also cause the AI system to be instructed to generate image prompts in a manner that cause generation of images having objects oriented in a specific manner. In some implementations, the set of constraints can specify an orientation of the objects relative to edges of the image. For example, the set of constraints can instruct the AI system to generate image prompts in a manner that cause an image generation model to generate images in which objects are oriented closer to a top of bottom of the generated images. Generating images in which objects depicted by the image are oriented closer to the top or bottom of the image enables the placement of other content (e.g., text) over the image in a way that prevents the objects from being partially and/or completely occluded by the text. With reference to FIG. 2, the sun in the image 226 is oriented closer to the top than the bottom of the image 226, such that when the text 228 is overlaid (or otherwise combined with the image 226) the text 228 does not occlude the sun depicted in the image 226. An example constraint can take the form of "place objects closer to the top of the image, leaving space for text at the bottom," or something similar, and the output image prompt for the publishing category may take the form of "Generate a warm toned, abstract painting of books stacked on a shelf with room at the bottom for text."

At least one image prompt is removed from the generated set of image prompts (304). In some implementations, a prompt is removed from the set based on a set of excluded terms/phrases that are not allowed to be included in qualified image prompts. For example, the AI system can compare each term/phrase (e.g., n-gram) of each generated image prompt to a set of excluded terms/phrases. When the AI system determines that there is a match between a term/phrase of a given generated image prompt and a term/phrase in the set of excluded terms/phrases, the AI system can classify the given generated image prompt as an unqualified image prompt, and remove the given generated image prompt from the set of generated image prompts and/or prevent the given generated image prompt from being included in a set of qualified image prompts. Once the comparison and removal of generated image prompts from the set of generated image prompts is complete, the remaining generated image prompts are considered a set of qualified image prompts.

A set of generated images are generated based on the set of qualified image prompts (306). In some implementations, the set of generated images are generated by, and obtained from, an image generation model, as discussed with reference to FIG. 2. For example, one or more of the qualified image prompts can be submitted to the image generation model by the AI system, and generated images can be received by the AI system as output from the image generation model.

One or more images are removed from the set of generated images (308). In some implementations, the one or more images are removed from the set of generated images based on the inclusion of an excluded object in the one or more images. The excluded objects are objects that are not allowed (e.g., by an administrator of the AI system) to be included in qualified images. The excluded objects can be, for example, depictions of people or animals. Of course, other objects can be added to the set of excluded objects as desired by the administrator of the AI system. Removal of images that depict excluded objects results in a set of qualified images, which can also be referred to as a set of qualified generated images.

In some implementations, the determination that a generated image depicts an excluded image can be performed by comparing each image in the set of generated images to a set of existing images (310). The comparison can be performed, for example, by performing a pixel-by-pixel comparison, object detection techniques (e.g., using machine learning models trained to identify objects depicted by images), or other techniques.

A match can be identified between a given generated image and an existing image can be identified (312). The match can be identified/determined, for example, by determining a level of similarity between the given generated image and the existing images. When the similarity of the given generated image and an existing is within a specified level of similarity and/or an exact match, the given generated image can be classified as an unqualified image (e.g., a generated image that does not qualify as a qualified image), and removed from the set of generated images (308).

Removal of the given image results in the given image not being included in the set of qualified images.

In some situations, the existing images can be a set of images that have already been generated by the AI system, such that removing the generated images that match the existing images prevents duplicate storage of the same and/or substantially similar images, thereby reducing wasted memory consumption, and ensuring that different images are being generated for different categories and/or different users.

In some situations, the existing images can be a set of training images that were used to train the AI system (e.g., the image generation model). In these situations, a given generated image is compared to the set of training images used to train the AI system, for example, as described above. Based on the comparison, a determination is made whether the given generated image matches at least one training image in the set of training images. The determination can be made, for example, based on a level of similarity between the given generated image and the training image. When the level of similarity is determined to be higher than a specified similarity threshold, the determination that a match exists can be made. In response to determining that the given generated image matches at least one of the training images, the given generated image can be excluded from the set of generated images and/or the set of qualified images (314).

The set of qualified images is stored (314). As previously discussed, each qualified image in the set of qualified images can be stored in a data structure with data specifying the category for which the qualified image was generated. For example, as discussed above, the category included in the image prompt that was used to generate the qualified image can be considered the category for which the qualified image was generated. Storing each qualified image with the category for which the qualified image was generated facilitates the use of a given category specified in a request for content as a search query to identify image that were generated for the given category, thereby reducing the search space for images when a request for content is received.

In some implementations, the set of qualified images can be stored with data specifying dimensions or other size information indicative of the size of the qualified image. As discussed above, this size information can be used to determine which images will fit in space of an electronic document that is available for presentation of content delivered in response to a request for content. This also enables the search space to be reduced, thereby reducing latency in identifying images responsive to a request for content, for example, by only considering those images that are stored with size information that is equal to or smaller than the size of the available space in the electronic document.

At least one qualified generated image is combined with other content to create a new digital component (316). In some implementations, as discussed with reference to FIG. 2, a given qualified image can be combined with text to create a new digital component. For example, the text can be overlayed on the given qualified image and positioned so that the text does not overlap/occlude a given object in the given qualified image or overlaps/occludes less than a pre-specified amount of the given object.

As previously discussed, the new digital component can be stored in a data structure with data specifying the category for which the qualified image included in the digital component was created. The new digital component can also be stored with size information specifying a size (e.g., dimensions) of the qualified image and/or digital component, in a manner similar to that discussed above.

A request for content in a given category is received (318). The request for content can be received, for example, from a client device that submitted the request for content (e.g., as described with reference to FIG. 1). The request can be considered a request for content in the given category, for example, by including data specifying the given category. The request can also be considered a request for content in the given category based on other information, such as a category of the electronic document on which content provided responsive to the request for content will be presented. The request can also include event data that can be used to select content for distribution, as discussed with reference to FIG. 1.

Content for distribution responsive to the request is selected based on the request for content in the given category (320). In some implementations, the selection of the content can be performed by searching the data structure for an image and/or new digital component that is stored with the given category. For example, in situations where new digital components have already been created and stored with the category for which the qualified image in the new digital component was created, the AI system can search the data structure for new digital components that are stored with the given category. In some implementations, the AI system uses event data to search rot the new digital components (or qualified images) in a manner similar to that discussed with reference to FIG. 1.

As discussed above, the creation of the new digital components, discussed with reference to step 316, can be created after the request for content is received. In these situations, the given category can be used to identify the qualified images that are stored with the given category, and then combined with text that can also be selected based on information in the request. In this way, each stored image can be used to create various different new digital components, while only having to store one instance of the qualified image. This can result in significant memory savings (e.g., more efficient use of memory), relative to storing multiple instances of the same image with different sets of text.

In some implementations, the selection of the content responsive to the request can be performed using size data included in the request for content. For example, the AI system can identify, in the request, size data specifying an amount of available space for presentation of a digital component in an electronic resource/document. Using this size information, the AI system can determine that a qualified image and/or new digital component fits in the available space based on the size data. For example, the AI system can compare size information for the qualified image and/or new digital component to the amount of available space. When the size of the qualified image and/or new digital component is within (e.g., smaller than or equal to) the size of the available space, the AI system can determine that the qualified image and/or new digital component fits in the available space. In response to determining that the qualified image and/or new digital component fits in the available space, the qualified image and/or new digital component can be selected for distribution/transmission to the client device from which the request for content originated.

In situations where a current size of a given qualified image and/or new digital component is smaller than the available space, the AI system can elect to increase the size of the given qualified image and/or new digital component by extending one or more dimensions of the given qualified image and/or new digital component. For example, the AI system can input a given qualified image (or new digital component) to an uncrop model that is configured to create additional pixels of content for the qualified image. The additional pixels can be added to at least one edge of the given qualified image, thereby increasing the size of the given qualified image. In some implementations, the amount of pixels added is based on a target size that is different from the current size of the given qualified image. The target size can be, for example, a size that is between the current size of the given qualified image and the size of the available space.

The AI system receives, as an output of the uncrop model, a modified version of the given qualified image that includes the additional pixels and has the target size. The AI system can then overlay (or otherwise place) additional content over the modified version of the given qualified image and/or the additional pixels to create an augmented digital component. For example, text can be overlaid on the modified version of the given qualified image in a manner similar to that discussed above. The augmented digital component can then be distributed over a network (e.g., to a client device).

The new digital component is transmitted to a client device in response to the request for content (322). As discussed above, the new digital component can be transmitted to the client device that submitted the request for content and incorporated into an electronic resource/document at the client device (e.g., in a manner similar to that discussed with reference to FIG. 1.

Figure 4:
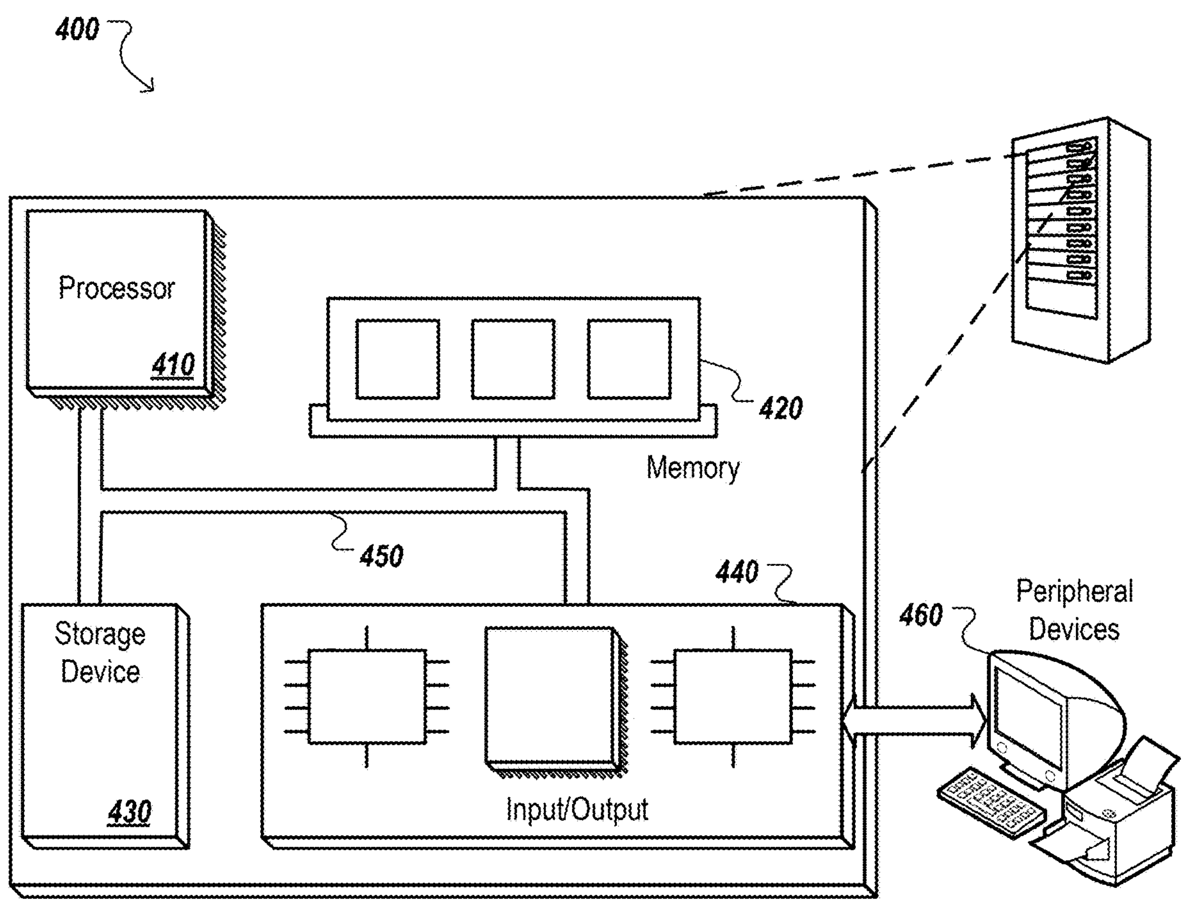
FIG. 4 a block diagram of an example computer.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices;

magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:

generating, by an artificial intelligence ("AI") system, image prompts based on (i) a category and (ii) a set of constraints that instruct the AI system to generate the image prompts in a manner that causes depictions of people to be omitted from generated images that are generated using the image prompts;

removing, from the image prompts generated by the AI system, at least one of the image prompts based on a set of excluded terms that are not allowed to be included in qualified image prompts, wherein removal of the at least one of the image prompts results in a set of qualified image prompts;

generating, by the AI system, a set of generated images using the set of qualified image prompts;

removing, from the set of generated images, one or more images that include excluded objects that are not allowed to be included in qualified images, wherein removal of the one or more images results in a set of qualified generated images;

storing, in a data structure, the set of qualified generated images with data specifying the category, wherein storing the set of qualified images with data specifying the category further comprises storing each qualified image in the set of qualified images with (i) data specifying the category and (ii) dimensions of the qualified image;

combining at least one qualified generated image from among the set of qualified generated images with other content, wherein the combining results in a new digital component;

receiving a request for content in the category;

transmitting, in response to the request, the new digital component to a client device.

2. The method of claim 1, further comprising:

comparing the set of generated images to a set of existing images;

matching a given image, among the set of generated images, to a matching image in the set of existing images; and removing the given image from the set of generated images based on the matching, wherein removal of the given image results in the given image not being included in the set of qualified generated images.

3. The method of claim 1, further comprising:

identifying, in the request for content, size data specifying available space for presentation of a digital component in an electronic resource;

determining that the new digital component fits in the available space based on the size data; and selecting the new digital component for transmission in response to the request based on the determination that the new digital component fits in the available space.

4. The method of claim 1, further comprising:

comparing a given generated image from among the set of generated images with a set of training images used to train the AI system;

determining, based on the comparing, that the given generated image matches at least one training image in the set of training images; and in response to determining that the given generated image matches the at least one training image, excluding the given generated image from the set of qualified images.

5. The method of claim 4, wherein generating the image prompts further comprises generating the image prompts in a manner that causes one or more objects depicted by the output images to be oriented closer to a top or bottom of generated images.

6. The method of claim 1 further comprising:

inputting a given qualified image having a current size to an uncrop model configured to create additional pixels of content for the given qualified image, wherein the additional pixels of content are added to at least one edge of the given qualified image based on a target size that differs from the current size of the given qualified image; and receiving an output of the uncrop model that includes a modified version of the given qualified image, wherein the modified version of the qualified image includes the additional pixels and has the target size;

overlaying additional content over the additional pixels of the modified version of the given qualified image to create an augmented digital component; and distributing the augmented digital component over a network.

7. An artificial intelligence ("AI") system comprising:

one or more memory devices; and one or more computing devices configured to interface with the one or more memory devices and execute instructions that cause the artificial intelligence system to perform operations comprising generating image prompts based on (i) a category and (ii) a set of constraints that instruct the AI system to generate the image prompts in a manner that causes depictions of people to be omitted from generated images that are generated using the image prompts;

removing, from the image prompts generated by the AI system, at least one of the image prompts based on a set of excluded terms that are not allowed to be included in qualified image prompts, wherein removal of the at least one of the image prompts results in a set of qualified image prompts;

generating a set of generated images using the set of qualified image prompts;

removing, from the set of generated images, one or more images that include excluded objects that are not allowed to be included in qualified images, wherein removal of the one or more images results in a set of qualified generated images;

storing, in a data structure, the set of qualified generated images with data specifying the category, wherein storing the set of qualified images with data specifying the category further comprises storing each qualified image in the set of qualified images with (i) data specifying the category and (ii) dimensions of the qualified image;

combining at least one qualified generated image from among the set of qualified generated images with other content, wherein the combining results in a new digital component;

receiving a request for content in the category;

transmitting, in response to the request, the new digital component to a client device.

8. The artificial intelligence system of claim 7, wherein the instructions cause the artificial intelligence system to perform operation further comprising:

comparing the set of generated images to a set of existing images;

matching a given image, among the set of generated images, to a matching image in the set of existing images; and removing the given image from the set of generated images based on the matching, wherein removal of the given image results in the given image not being included in the set of qualified generated images.

9. The artificial intelligence system of claim 8, wherein the instructions cause the artificial intelligence system to perform operations further comprising:

identifying, in the request for content, size data specifying available space for presentation of a digital component in an electronic resource;

determining that the new digital component fits in the available space based on the size data; and selecting the new digital component for transmission in response to the request based on the determination that the new digital component fits in the available space.

10. The artificial intelligence system of claim 7, wherein the instructions cause the artificial intelligence system to perform operations further comprising:

comparing a given generated image from among the set of generated images with a set of training images used to train the AI system;

determining, based on the comparing, that the given generated image matches at least one training image in the set of training images; and in response to determining that the given generated image matches the at least one training image, excluding the given generated image from the set of qualified images.

11. The artificial intelligence system of claim 10, wherein generating the image prompts further comprises generating the image prompts in a manner that causes one or more objects depicted by the output images to be oriented closer to a top or bottom of generated images.

12. The artificial intelligence system of claim 7, wherein the instructions cause the artificial intelligence system to perform operations further comprising:

inputting a given qualified image having a current size to an uncrop model configured to create additional pixels of content for the given qualified image, wherein the additional pixels of content are added to at least one edge of the given qualified image based on a target size that differs from the current size of the given qualified image; and receiving an output of the uncrop model that includes a modified version of the given qualified image, wherein the modified version of the qualified image includes the additional pixels and has the target size;

overlaying additional content over the additional pixels of the modified version of the given qualified image to create an augmented digital component; and distributing the augmented digital component over a network.

13. A non-transitory computer readable medium storing instructions that, upon execution by one or more data processing apparatus of an artificial intelligence system, cause the artificial intelligence system to perform operations comprising:

generating image prompts based on (i) a category and (ii) a set of constraints that instruct the AI system to generate the image prompts in a manner that causes depictions of people to be omitted from generated images that are generated using the image prompts;

removing, from the image prompts generated by the AI system, at least one of the image prompts based on a set of excluded terms that are not allowed to be included in qualified image prompts, wherein removal of the at least one of the image prompts results in a set of qualified image prompts;

generating a set of generated images using the set of qualified image prompts;

removing, from the set of generated images, one or more images that include excluded objects that are not allowed to be included in qualified images, wherein removal of the one or more images results in a set of qualified generated images;

storing, in a data structure, the set of qualified generated images with data specifying the category, wherein storing the set of qualified images with data specifying the category further comprises storing each qualified image in the set of qualified images with (i) data specifying the category and (ii) dimensions of the qualified image;

combining at least one qualified generated image from among the set of qualified generated images with other content, wherein the combining results in a new digital component;

receiving a request for content in the category;

transmitting, in response to the request, the new digital component to a client device.

14. The non-transitory computer readable medium of claim 13, wherein the instructions cause the artificial intelligence system to perform operation further comprising:

comparing the set of generated images to a set of existing images;

matching a given image, among the set of generated images, to a matching image in the set of existing images; and removing the given image from the set of generated images based on the matching, wherein removal of the given image results in the given image not being included in the set of qualified generated images.

15. The non-transitory computer readable medium of claim 13, wherein the instructions cause the artificial intelligence system to perform operations further comprising:

identifying, in the request for content, size data specifying available space for presentation of a digital component in an electronic resource;

determining that the new digital component fits in the available space based on the size data; and selecting the new digital component for transmission in response to the request based on the determination that the new digital component fits in the available space.

16. The non-transitory computer readable medium of claim 13, wherein the instructions cause the artificial intelligence system to perform operations further comprising:

comparing a given generated image from among the set of generated images with a set of training images used to train the AI system;

determining, based on the comparing, that the given generated image matches at least one training image in the set of training images; and in response to determining that the given generated image matches the at least one training image, excluding the given generated image from the set of qualified images.

17. The non-transitory computer readable medium of claim 16, wherein generating the image prompts further comprises generating the image prompts in a manner that causes one or more objects depicted by the output images to be oriented closer to a top or bottom of generated images.

18. The non-transitory computer readable medium of claim 13, wherein the instructions cause the artificial intelligence system to perform operations further comprising:

inputting a given qualified image having a current size to an uncrop model configured to create additional pixels of content for the given qualified image, wherein the additional pixels of content are added to at least one edge of the given qualified image based on a target size that differs from the current size of the given qualified image; and receiving an output of the uncrop model that includes a modified version of the given qualified image, wherein the modified version of the qualified image includes the additional pixels and has the target size;

overlaying additional content over the additional pixels of the modified version of the given qualified image to create an augmented digital component; and distributing the augmented digital component over a network.

* * * * *